US009300348B2

(12) United States Patent
Schriel et al.

(10) Patent No.: US 9,300,348 B2
(45) Date of Patent: Mar. 29, 2016

(54) DUAL ELECTRICAL COMPACT SMALL FORM-FACTOR PLUGGABLE MODULE

(71) Applicant: Alcatel-Lucent Canada, Inc., Ottawa (CA)

(72) Inventors: James M. Schriel, Kanata (CA); Rami Labib, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/456,136

(22) Filed: Aug. 11, 2014

(65) Prior Publication Data

US 2016/0043766 A1 Feb. 11, 2016

(51) Int. Cl.
*H04B 1/38* (2015.01)
*H04B 1/40* (2015.01)

(52) U.S. Cl.
CPC ........................................ *H04B 1/40* (2013.01)

(58) Field of Classification Search
CPC ........ H04B 10/27; H04B 10/272; H04B 1/38; H04B 1/0057; H04B 10/803
USPC .................................................. 375/219–222
See application file for complete search history.

(56) References Cited

U.S. PATENT DOCUMENTS

| | | | | |
|---|---|---|---|---|
| 6,829,252 | B1 * | 12/2004 | Lewin et al. ................... | 370/493 |
| 7,149,397 | B2 | 12/2006 | Popovic et al. | |
| 7,273,399 | B2 * | 9/2007 | LeGrow et al. ............. | 439/620.2 |
| 7,873,385 | B2 * | 1/2011 | Boireau et al. ............. | 455/553.1 |
| 7,961,746 | B2 * | 6/2011 | Jan ...................... G06F 13/4045 | 370/419 |
| 8,032,916 | B2 * | 10/2011 | Oyadomari ............ H04H 60/97 | 370/294 |
| 8,989,590 | B2 * | 3/2015 | Wojtowicz ............. H04B 10/40 | 398/135 |
| 2003/0196126 | A1 * | 10/2003 | Fung ...................... G06F 1/3203 | 713/300 |
| 2009/0083422 | A1 * | 3/2009 | McKay ............... H04L 63/0272 | 709/225 |
| 2010/0260503 | A1 * | 10/2010 | Zhovnirovsky et al. ...... | 398/118 |
| 2012/0257856 | A1 | 10/2012 | Lavoie et al. | |
| 2013/0136446 | A1 | 5/2013 | Hotchkiss et al. | |
| 2013/0223484 | A1 | 8/2013 | Tang et al. | |
| 2014/0071855 | A1 * | 3/2014 | Robitaille et al. ............ | 370/255 |
| 2014/0258742 | A1 * | 9/2014 | Chien ..................... H04L 12/10 | 713/300 |
| 2015/0078740 | A1 * | 3/2015 | Sipes, Jr. .............. H04B 10/808 | 398/16 |
| 2015/0112467 | A1 * | 4/2015 | McKillop et al. ............... | 700/94 |
| 2015/0172423 | A1 * | 6/2015 | Wu et al. ...................... | 398/118 |
| 2015/0195604 | A1 * | 7/2015 | Synowiec ............ G02B 6/4201 | 361/679.22 |
| 2015/0229527 | A1 * | 8/2015 | Robitaille ............. H04L 5/1438 | 370/255 |

FOREIGN PATENT DOCUMENTS

EP 2 706 707 A1 3/2014

\* cited by examiner

*Primary Examiner* — Emmanuel Bayard
(74) *Attorney, Agent, or Firm* — Kramer & Amado, P.C.

(57) ABSTRACT

Various exemplary embodiments relate to a compact small form-factor pluggable (CSFP) module including: a CSFP connector; a dual Ethernet receptacle; a first Ethernet transceiver connected between the CSFP connector and the dual Ethernet connector; a second Ethernet transceiver connected between the CSFP connector and the dual Ethernet connector; a processor connected to the CSFP connector, the first Ethernet transceiver, and the second Ethernet transceiver, wherein the processor receives control messages from the CSFP connector and wherein the processor transmits control messages to the first and second Ethernet transceivers.

20 Claims, 2 Drawing Sheets

US 9,300,348 B2

DUAL ELECTRICAL COMPACT SMALL FORM-FACTOR PLUGGABLE MODULE

TECHNICAL FIELD

Various exemplary embodiments disclosed herein relate generally to dual electrical input compact small-form factor pluggable modules.

BACKGROUND

The compact small form-factor pluggable (CSFP) transceiver is a compact, hot-pluggable transceiver used for both telecommunication and data communications applications. The form factor and electrical interface are specified by a multi-source agreement (MSA) It interfaces a network device motherboard (for example, a switch, router, media converter or similar device) to a fiber optic or copper networking cable. It is a popular industry format jointly developed and supported by many network component vendors. CSFP transceivers may be designed to support SONET, Gigabit Ethernet, Fiber Channel, and other communications standards.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments described herein relate to compact small form-factor pluggable (CSFP) module including: a CSFP connector; a dual Ethernet receptacle; a first Ethernet transceiver connected between the CSFP connector and the dual Ethernet connector; a second Ethernet transceiver connected between the CSFP connector and the dual Ethernet connector; a processor connected to the CSFP connector, the first Ethernet transceiver, and the second Ethernet transceiver, wherein the processor receives control messages from the CSFP connector and wherein the processor transmits control messages to the first and second Ethernet transceivers.

Various embodiments described herein relate to a compact small form-factor pluggable (CSFP) module including: a receptacle section including two openings configured to receive a plug connector; a printed circuit board (PCB) including a first Ethernet transceiver, a second Ethernet transceiver, a processor, and a CSFP connector; a middle section between the receptacle section and the PCB configured to electrically connect the plug connector to the PCB.

Various embodiments described herein relate to a compact small form-factor pluggable (CSFP) module including: a CSFP connector; a dual Ethernet receptacle, wherein the dual Ethernet receptacle includes two RJ.5 receptacles; a first Ethernet transceiver connected between the CSFP connector and the dual Ethernet connector; a second Ethernet transceiver connected between the CSFP connector and the dual Ethernet connector; a processor connected to the CSFP connector, the first Ethernet transceiver, and the second Ethernet transceiver, wherein the processor receives control messages from the CSFP connector and wherein the processor transmits control messages to the first and second Ethernet transceivers, wherein the control messages from the CSFP connector are inter-integrated circuit (I2C) bus messages, wherein the control messages to the first and second Ethernet transceivers are management data input/output (MDIO) bus messages, wherein processor bridges I2C messages to MDIO messages.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure or substantially the same or similar function.

DETAILED DESCRIPTION

Figure 1:
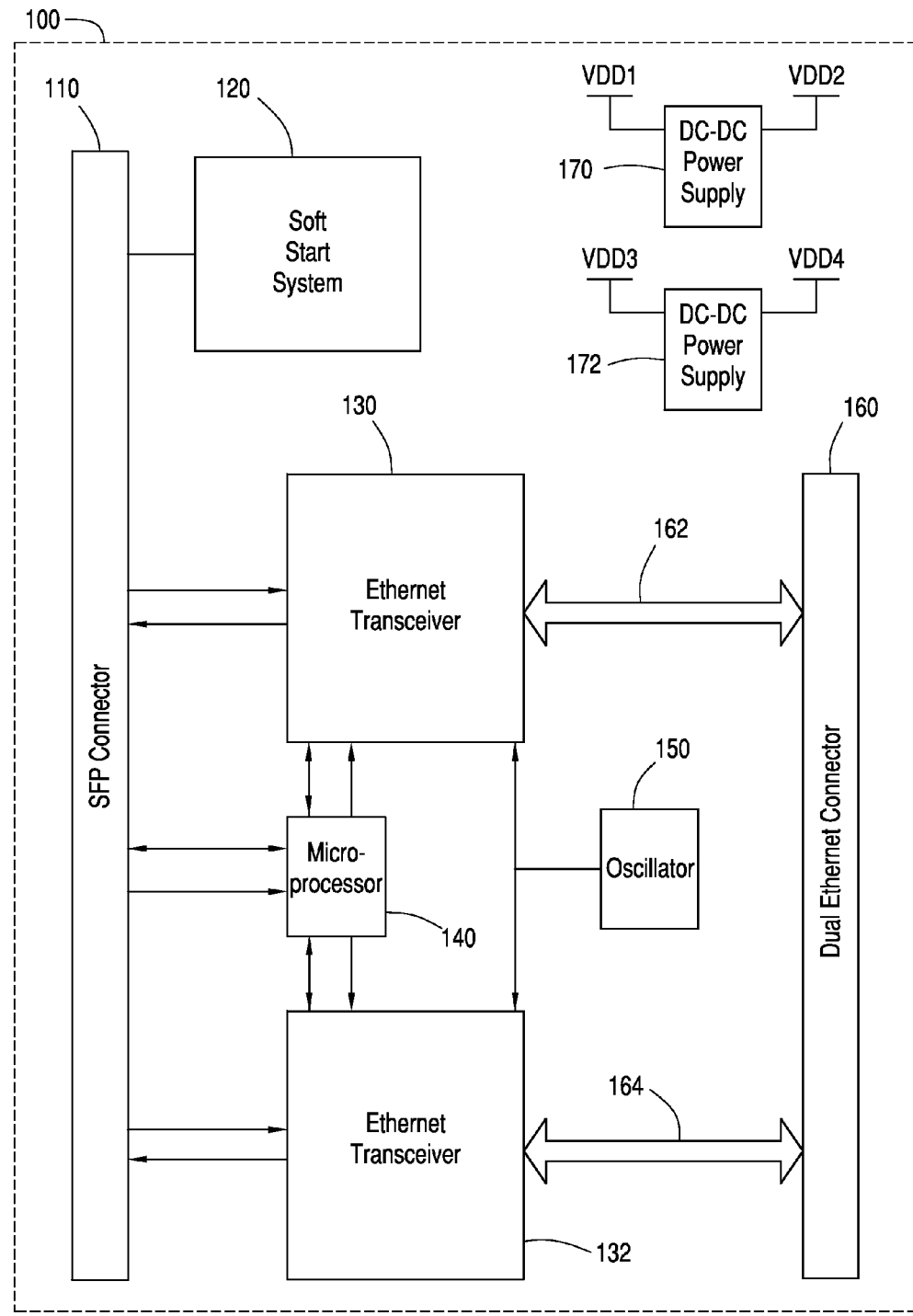
FIG. 1 illustrates a block diagram of an embodiment of a CSFP transceiver with a dual electrical interface.

The description and drawings presented herein illustrate various principles. It will be appreciated that those skilled in the art will be able to devise various arrangements that, although not explicitly described or shown herein, embody these principles and are included within the scope of this disclosure. As used herein, the term, "or," as used herein, refers to a non-exclusive or (i.e., or), unless otherwise indicated (e.g., "or else" or "or in the alternative"). Additionally, the various embodiments described herein are not necessarily mutually exclusive and may be combined to produce additional embodiments that incorporate the principles described herein.

The CSFP-MSA defines the mechanical and electrical characteristics of CSFP transceivers including mechanical dimensions, power dissipation, and a 20-pin MAC-PHY interface. Current SFP/CSFP transceivers may accommodate a single electrical connection using for example an RJ45 Ethernet connection. Also, current CSFP transceivers may accommodate one or two optical connections. The two optical connection variation currently provides the highest density connection option. This optical option presents the following problems. It requires fiber to be available which is not the case in many locations. Further, it common to have existing cat5e cabling already laid. The optical CSFP transceiver does not directly attach to legacy Ethernet designs. CSFP designs are bidirectional with transmit and receive on the same fiber. Previous implementations have always used separate fibers for transmit and receive. This means that some additional device will be needed to split the CSFP signals out onto two fibers to allow them to connect to existing optical interfaces. Optical connections also cost more than electrical connections, especially when the copper is already available.

If only electrical connections are available, then current solutions only allow for a single connection per CSFP transceiver leading to half the port density and under-utilization of the router/switch.

Embodiments are described below that overcome the problems described above that may exist when cabling a network. These embodiments provide the option to, for example, use electrical interface 10/100/1000BaseT and cat5e cabling without sacrificing port density.

The CSFP-MSA defines a 20-pin MAC to PHY interface, allowable power budget, and mechanical dimension for a pluggable optical interface module. The embodiments described below conform to the requirements in CSFP-MSA and also support electrical interfaces (e.g., 10/100/1000Base-T Ethernet) within the pluggable form factor to essentially double the electrical port density previously achievable. One exception to meeting the dimensional requirements of the CSFP-MSA may be that the length of CSFP transceiver outside the cage may slightly exceed the CSFP-MSA requirements. Such has also been done with existing single port RJ45 designs. This extension does not impede the functionality of the design.

The mechanical dimensions in the CSFP-MSA are very stringent and are carefully specified in the CSFP-MSA. One key aspect in the CSFP-MSA is the allocated area for the media interface for the CSFP transceiver, which is 12.6 mm by 13.7 mm. The embodiments described herein may use RJ.5 connector system in a dual 2×1 ganged configuration. Standard RJ.5 receptacles are not capable of meeting the space requirements, but with modification they may be shrunk and configured to meet the requirements. These modified RJ.5 receptacles with built in magnetic isolation circuitry may allow for two Ethernet cat5e connections to fit within dimensions of the CSFP transceiver.

The CSFP-MSA allows a power budget of 300 mA at 3.3V per port. For a 10/100/1000Base-T interface this is difficult to achieve because previously available 10/100/1000BaseT transceivers achieve ~350 mA for one port, which is slightly above the allowed budget. New Ethernet transceiver devices are available to overcome this problem because they provide a lower current alternative. These new Ethernet transceiver devices however use a management data input/output (MDIO) control interface. MDIO is a serial bus defined for the Ethernet family of IEEE 802.3 standards for the Media Independent Interface (MII). The MII connects Media Access Control (MAC) devices with Ethernet physical layer (PHY) circuits (or Ethernet transceivers). The CSFP-MSA expects an inter-integrated circuit (I2C) compliant device. The embodiments described herein use a local processor to bridge the I2C to MDIO transactions. The processor may also control the serial EEPROM (SEEP) and soft start system for the CSFP transceiver to satisfy the SFP/CSFP requirements. This solution allows the same 20-pin interface to be supported and provides per port power of 170 mA.

FIG. 1 illustrates a block diagram of an embodiment of a CSFP transceiver with a dual electrical interface. The CSFP transceiver 100 may include an CSFP connector 110, a soft start system 120, a first Ethernet transceiver 130, a second Ethernet transceiver 132 a microprocessor 140, an oscillator 150, dual Ethernet receptacle 160, and DC-DC power supplies 170, 172.

The CSFP connector 110 may be the 20-pin MAC-PHY interface specified in the CSFP-MSA. The CSFP connector 110 includes a "Loss of Signal (LOS)" signal that indicates that the received optical power is below the worst-case receiver sensitivity and a "TX Fault" signal that indicates that a laser fault of some kind has occurred. These signals do not have a meaning in the CSFP transceiver 100 so these signals may be tied low so that a LOS or Tx_Fault will ever be reported.

The soft start system 120 provides a hot-swappable functionality to the CSFP transceiver 100. The soft start system 120 may be connected to the CSFP connector 110 and then will work with the microprocessor 140 in order to power up or power down the CSFP transceiver as it is connected/disconnected from a router/switch. Any implementation or design of such a system may be used in the soft start system 120.

The Ethernet transceivers 130, 132 implement the Ethernet physical layer portion of the 1000BASE-T, 100BASE-TX, and 10BASE-T Ethernet standards. Further, the Ethernet transceiver may be an integrated circuit (IC) that implements the hardware send and receive function of Ethernet frames; it interfaces to the line modulation at one end and binary packet signaling at the other. An example of a Ethernet transceiver 130, 132 is a Marvel 88E1514 PHY device. The Marvel device consumes about 170 mA per port, leading to a low power consumption.

The Ethernet transceivers 130, 132 may be connected to the CSFP connector 110 using a serial gigabit media independent interface (SGMII). SGMII is used to be compliant with the CSFP-MSA, but other interface protocols may be used based upon the requirements of the connected device such as a router or switch.

The Ethernet transceivers 130, 132 may also be connected to the dual Ethernet receptacle 160 using a media independent interface (MIT). MII is a standard interface used to connect an Ethernet MAC-block to an Ethernet transceiver. Being media independent means that different types of physical layer transceiver devices for connecting to different media (i.e., twisted pair copper, fiber optic, etc.) can be used without redesigning or replacing the media access controller (MAC) hardware. The MII bus connects different types of physical transceivers to MACs. Thus any MAC may be used with any physical transceiver independent of the network signal transmission media.

The Ethernet transceivers 130, 132 may also communicate with the microprocessor 140, and this communication will be described in further detail below. Further, an oscillator 150 may provide a clock signal to the Ethernet transceivers 130, 132.

The microprocessor 140 may be any type of processor that can carry out the functions assigned to the microprocessor as well as having a sufficiently low power consumption and small size. The processor 140 may include memory or use external memory. Such memory may include instructions to be executed by the processor or data related to the operation of the CSFP transceiver 100.

The microprocessor 140 provides various control functions in the CSFP transceiver 100. Many Ethernet transceivers 130, 132 use a management data input/output (MDIO) control interface, but the CSFP-MSA specifies an I2C control interface. Accordingly, the microprocessor 140 may provide a bridge between the MDIO and I2C interfaces. The microprocessor 140 may be connected to the CSFP connector 110 to receive control commands and other information using the I2C interface. The microprocessor 140 may then convert those control commands and information into MDIO commands and information to be sent to the Ethernet transceivers 130, 132. Also, the microprocessor 140 may receive information from the Ethernet transceivers 130, 132 over the MDIO interface that the microprocessor 140 then converts and transmits using the I2C interface to the CSFP connector 110. The microprocessor 140 may also send reset commands to the Ethernet transceivers 130, 132. The microprocessor 140 may also control the serial EEPROM (SEEP) and soft start system for the CSFP transceiver to satisfy the CSFP requirements. Further, the microprocessor 140 may control any other functions needed on the CSFP transceiver 100.

The dual Ethernet receptacle 160 provides electrical connectivity to a wired Ethernet cable. The dual Ethernet receptacle 160 may receive a RJ.5 type of plug connected to the wired Ethernet cable. Further, the receptacle 160 may be configured to receive any other type of connecter where two can fit within the size restraints specified in the CSFP-MSA. It is contemplated that other types of small, compact plugs may be developed, and the dual Ethernet receptacle 160 may be configured to accept such plugs. The dual Ethernet receptacle 160 also includes magnetic isolation circuitry that provides for the isolation of DC and large signals from the connected electrical cable.

Figure 3:
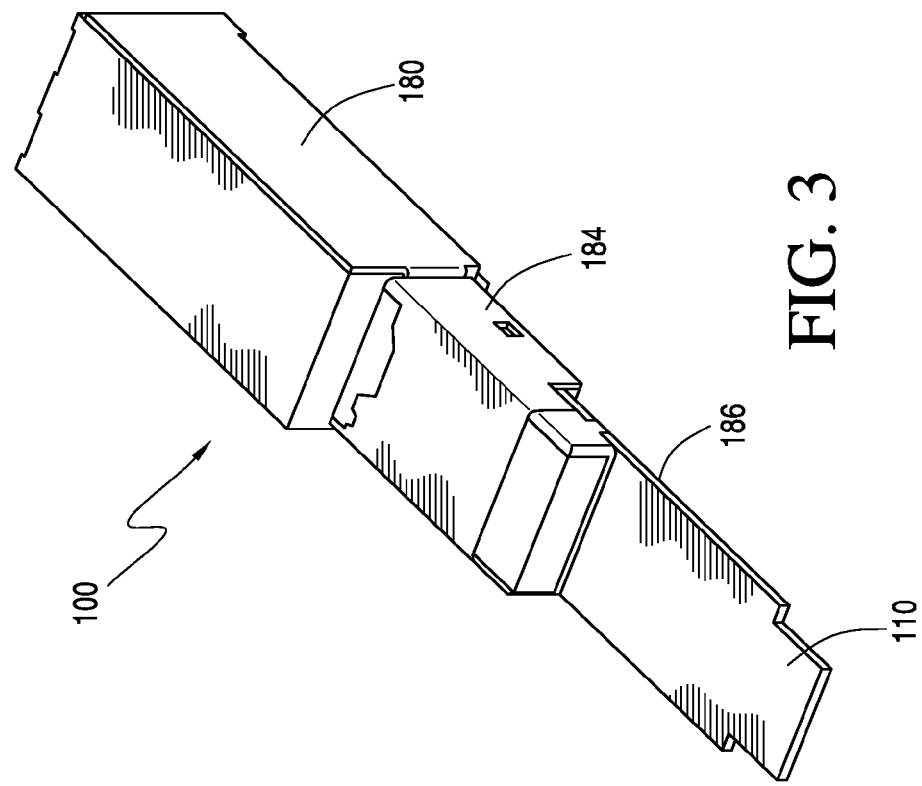
FIGS. 2 and 3 are two respective views of an embodiment of the CSFP transceiver.
Figure 2:
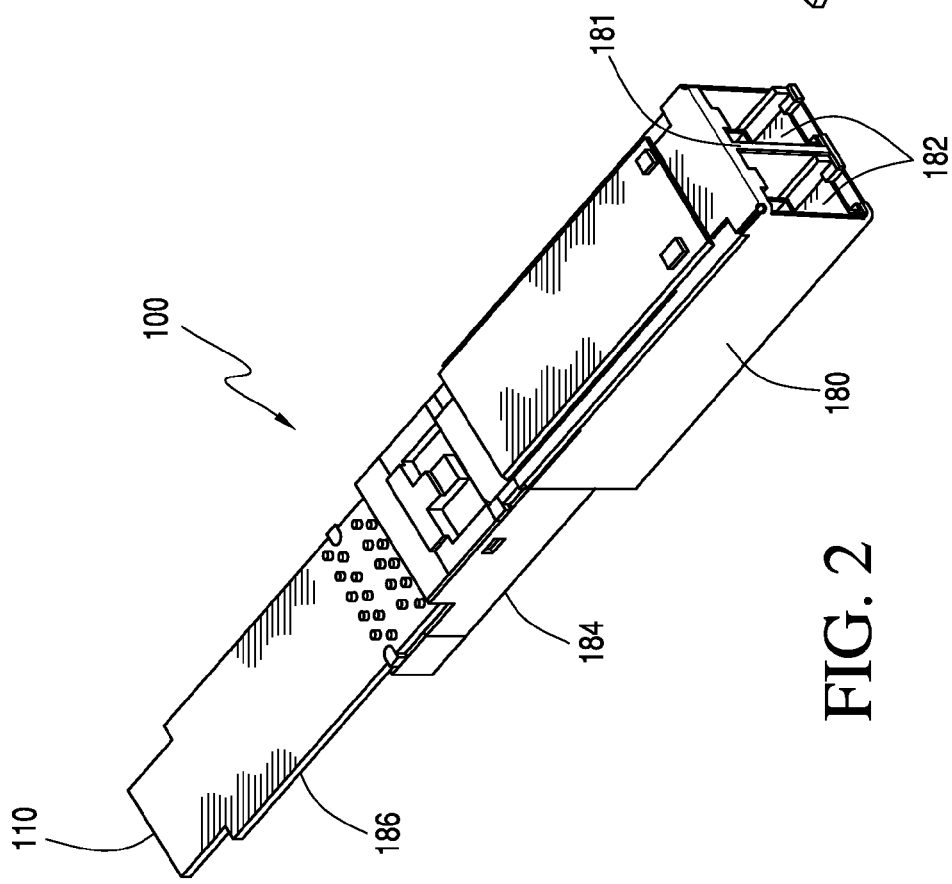

FIGS. 2 and 3 are two respective views of an embodiment of the CSFP transceiver. The CSFP transceiver 100 may include a receptacle section 180, a middle section 184, and a printed circuit board (PCB) 186. The various portions of the CSFP transceiver 100 are sized such that the various dimensional requirements of the CSFP-MSA are met.

The receptacle section 180 is configured to have a face plate 181 that includes two openings 183 that may receive plugs connected to the Ethernet cable. Additional structures within the receptacle section 180 may include electrical contacts, guides, and a locking mechanism. The guides align a received Ethernet plug to facilitate electrical contact between the Ethernet plug and the electrical contacts in the receptacle section 180. Further, the locking mechanism may lock the Ethernet plug in the receptacle section 180. Also, the receptacle section 180 is configured such that it may accommodate two connectors within the dimensions specified by the CSFP-MSA.

The middle section 184 may include the magnetic isolation circuitry as well as electrical connections between the receptacle section 180 and the PCB 186. Alternatively, the magnetic isolation circuitry may reside in the receptacle section 180 or both the middle section 184 and the receptacle section 180.

Various circuit elements may be mounted on the PCB 186. These may include the Ethernet transceivers 130, 132, the micro processor 140, the oscillator 150, the DC-DC power supplies 170, 172, and the soft start system 120. Further, the PCB may include the CSFP connector 110. The PCB will include the various connections between the various circuit elements. Also, the PCB may extend into the middle section 184 and the receptacle section 180. In such a case the magnetic isolation circuit may be mounted on the PCB.

While the above embodiments have been described using exemplary elements such as the CSFP connector, RJ.5 connector and various standards such as the CSFP-MSA, Ethernet, I2C, MDIO, MII, SGMII, the above embodiments may include other connectors and standards.

The embodiments described above provide various benefits. They allow a CSFP based linecard to be deployed and then the transport media to be selected independently depending on location specific requirements. They double the electrical port density for CSFP based designs. They allow reuse of existing cat5e cabling that is typically cheaper to install. They allow for the direct attachment to existing Ethernet equipment. They decrease the per port power for electrical ports.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A compact small form-factor pluggable (CSFP) module comprising:
    a CSFP connector;
    a dual Ethernet receptacle;
    a first Ethernet transceiver connected between the CSFP connector and the dual Ethernet receptacle;
    a second Ethernet transceiver connected between the CSFP connector and the dual Ethernet receptacle;
    a processor connected to the CSFP connector, the first Ethernet transceiver, and the second Ethernet transceiver, wherein the processor receives control messages from the CSFP connector and wherein the processor transmits control messages to the first and second Ethernet transceivers.

2. The module of claim 1, wherein the control messages from the CSFP connector are inter-integrated circuit (I2C) bus messages.

3. The module of claim 2, wherein the control messages to the first and second Ethernet transceivers are management data input/output (MDIO) bus messages.

4. The module of claim 3, wherein processor bridges I2C messages to MDIO messages.

5. The module of claim 1, further comprising a soft start system connected to the CSFP connector.

6. The module of claim 5, wherein the processor controls the soft start system.

7. The module of claim 1, wherein the dual Ethernet receptacle includes two RJ.5 receptacles.

8. The module of claim 1, wherein the dual Ethernet receptacle includes a magnetic isolation circuit.

9. The module of claim 1, wherein the first and second Ethernet transceivers communicate with the dual Ethernet receptacle using a media independent interface.

10. The module of claim 1, wherein the Ethernet transceivers communicate with the CSFP connector using a serial gigabit media independent interface.

11. A compact small form-factor pluggable (CSFP) module comprising:
    a receptacle section including two openings configured to receive a plug connector;
    a printed circuit board (PCB) including a first Ethernet transceiver, a second Ethernet transceiver, a processor, and a CSFP connector; and
    a middle section between the receptacle section and the PCB configured to electrically connect the plug connector to the PCB.

12. The module of claim 11, wherein dimensions of the CSFP module meet the dimensional requirements of a CSFP multisource agreements (CSFP-MSA), except for the length of the CSFP module outside of a CSFP cage.

13. The module of claim 11, the dual Ethernet receptacle includes two RJ.5 receptacles.

14. The module of claim 11, wherein the receptacle section includes a magnetic isolation circuit.

15. The module of claim 11, wherein the middle section includes a magnetic isolation circuit.

16. The module of claim 11, wherein the processor receives control messages from the CSFP connector that are inter-integrated circuit (I2C) bus messages[s].

17. The module of claim 16 wherein the first and second Ethernet transceivers receive control messages from the processor that are management data input/output (MDIO) bus messages.

18. The module of claim 17, wherein processor is connected to the CSFP connector and the first and second Ethernet transceivers and wherein the processor bridges I2C messages to MDIO messages.

19. The module of claim 11, wherein the receptacle section further includes guides and a locking mechanism configured to secure the plug connector to the receptacle section.

20. A compact small form-factor pluggable (CSFP) module comprising:
- a CSFP connector;
- a dual Ethernet receptacle, wherein the dual Ethernet receptacle includes two RJ.5 receptacles;
- a first Ethernet transceiver connected between the CSFP connector and the dual Ethernet receptacle;
- a second Ethernet transceiver connected between the CSFP connector and the dual Ethernet receptacle;
- a processor connected to the CSFP connector, the first Ethernet transceiver, and the second Ethernet transceiver, wherein the processor receives control messages from the CSFP connector and wherein the processor transmits control messages to the first and second Ethernet transceivers,
- wherein the control messages from the CSFP connector are inter-integrated circuit (I2C) bus messages
- wherein the control messages to the first and second Ethernet transceivers are management data input/output (MDIO) bus messages,
- wherein processor bridges I2C messages to MDIO messages.

* * * * *